United States Patent [19]
Sansone

[11] Patent Number: 5,231,252
[45] Date of Patent: Jul. 27, 1993

[54] SENSOR PLATFORM FOR USE IN SEISMIC REFLECTION SURVEYS

[76] Inventor: Stanley A. Sansone, 621-17th St., Ste. 2630, Denver, Colo. 80293

[21] Appl. No.: 901,517

[22] Filed: Jun. 19, 1992

[51] Int. Cl.[5] .............................................. G01V 1/16
[52] U.S. Cl. .................... 181/122; 181/112; 367/153; 367/173; 367/188
[58] Field of Search ................. 181/108–110, 181/112, 124, 122, 401; 367/5, 6, 15, 16, 106, 130, 153, 173, 178, 188

[56] References Cited

U.S. PATENT DOCUMENTS

| | | | |
|---|---|---|---|
| 2,738,488 | 3/1956 | MacKnight | 340/7 |
| 4,134,097 | 1/1979 | Cowles | 367/15 |
| 4,138,658 | 2/1979 | Avedik et al. | 340/7 R |
| 4,463,451 | 7/1984 | Warmack et al. | 367/16 |
| 4,838,379 | 6/1989 | Maxwell | 181/122 |
| 4,893,290 | 1/1990 | McNeel et al. | 367/178 |
| 5,010,531 | 4/1991 | McNeel | 367/188 |
| 5,014,813 | 5/1991 | Fussell | 181/122 |
| 5,117,396 | 5/1992 | Castile et al. | 367/3 |
| 5,142,499 | 8/1992 | Fletcher | 367/20 |

*Primary Examiner*—J. Woodrow Eldred
*Attorney, Agent, or Firm*—William E. Hein

[57] ABSTRACT

A seismic sensor platform comprises an open frame and a plurality of seismic motion sensors vertically positioned in a common horizontal plane in spaced relationship around the periphery of the open frame. A spike associated with each of the sensors extends beneath the open frame for anchoring each of the sensors in the earth. The frame includes a shield for protecting the sensors from physical damage and for shielding them from seismic noise. Second and third pluralities of horizontally positioned sensors may be provided on the frame, orthogonally positioned with respect to each other to sense orthogonal components of reflected seismic waves. The sensors may each be of a different natural frequency to optimize the multifrequency output of the sensor array.

22 Claims, 3 Drawing Sheets

SENSOR PLATFORM FOR USE IN SEISMIC REFLECTION SURVEYS

Background and Summary of the Invention

This invention relates generally to seismic prospecting and, more specifically, to geophone arrays for use in shallow marine, river, and land environments.

Originally, seismic acquisition contractors used geophone and hydrophone arrays with the individual geophones and hydrophones being connected by a flexible wire for the purposes of electrical communication and, in the case of hydrophones, position maintenance through drag. A serious impediment exists in fast moving bodies of water such as rivers and tidal marine areas.

Seismic acquistion in the marine environment has typically utilized a number of hydrophone arrays strung together by wire and towed behind a boat. Movement of the boat deploys a drag type seismic cable containing the hydrophones and hydrophone arrays in a straight line. The hydrophone arrays are coupled to the body of water overlying the sediment and rock. Since the reflection coefficient at the seabed or water/earth interface is very large, the reflection energy reaching the hydrophone arrays is significantly attenuated due to this large reflection coefficient. Tidal marine conditions exist in coastal areas where strong horizontal ocean currents can easily destroy seismic equipment. Fast moving bodies of water like rivers also have very strong currents that have made previous attempts to acquire seismic reflection data in these water environments generally unsuccessful.

Navigation and position maintenance of a drag type seismic cable containing hydrophone arrays in tidal marine and river environments is very treacherous. Strong currents easily disrupt loosely connected geophone arrays strung together by wire. Sheltering of marine and land geophones from noise Exemplary of the prior art is U.S. Pat. No. 3,416,629 to Brede, which is directed to an apparatus for stabilizing a drag type seismic cable containing hydrophone arrays through the use of a boat at one end of the tow line and a data collection truck based on the shore. The apparatus of Brede is subject to undesireable attenuation of the hydrophone signal due to the reflection coefficient of the seabed.

U.S. Pat. No. 4,463,451 to Warmack teaches a way to stabilize and maintain the relative position of a single geophone in a water covered area using a recording float and an elaborate tension filter, which is expensive and difficult to deploy.

U.S. Pat. No. 2,738,488 to MacKnight is directed to a single drag type cable employing single geophone attachments, which have questionable coupling and position control in tidal marine areas and fast moving rivers.

U.S. Pat. No. 5,014,813 to Fussell is directed to a waterproof housing for single seismic sensor typically used in marshes and other areas of quiet water. The typical marsh geophone is elongate and is made to be coupled or positioned in the mud. Groups of geophones are connected by wire for the purpose of electrical communication. Planted singly, these geophones arrays can easily become decoupled and are ineffictive in tidal marine areas and rivers.

U.S. Pat. No. 4,138,658 to Avedik is directed to a complex pickup, comprising a detachable frame, a hydrophone and two geophones that are used in water depts of 100-200 meters in connection with refraction surveys. This arrangement suffers from poor earth coupling, since the geophones are not individually planted in the earth. Only the frame is directly coupled to the earth through the three feet that are provided on the underside thereof. Therefore, the geophones sense refractions through the frame, rather than directly from the earth.

Seismic acquisition on land has in the past utilized a plurality of geophone arrays strung together by wire for the purpose of electrical communication to a multichannel recording unit. Individual geophone arrays normally consist of a plurality of geophones that are planted in spaced groupings of 12-24 geophones over distances of 55-440 feet by unskilled operators who have little regard for proper orientation of the geophones. Terrain changes are not usually taken into account. When these arrays of geophones are planted on hillsides, plane reflection waves coming from different directions impinge on the group array at different angles, thereby causing misalignment of the response signals.

In an attempt to improve data quality, three-dimensional geophones have been used to measure motion in three orthogonal directions. Each three-dimensional geophone typically comprises three separate unidirectional geophones that are oriented for three-dimensional pickup and housed in a single enclosure, as typified by the geophone described in U.S. Pat. No. 5,010,531 to McNeel. These devices are disadvantageous in that they are difficult to repair and require strict horizontal placement.

It is therefore an object of the present invention to provide a seismic sensor platform for retaining a plurality of seismic sensors in a configuration that results in a more accurate measurement of seismic reflection energy.

It is another object of the present invention to provide a seismic sensor platform that can be securely anchored in the earth at the bottom of tidal marine areas and fast moving rivers.

It is another object of the present invention to provide a seismic sensor platform that affords physical protection for the seismic sensors retained thereby and that also screens them from undesirable noise resulting from water and wind turbulence.

It is another object of the present invention to provide a seismic sensor platform for retaining a plurality of seismic sensors in positions that permit them to be individually anchored in the earth.

It is another object of the present invention to provide a tension filter that is simple and effective in isolating strong surface currents from an anchored seismic sensor platform.

It is another object of the present invention to provide a seismic sensor platform for retaining a plurality of seismic sensors in groups to obtain more effective sampling of multiple vectors of reflected seismic energy.

It is another object of the present invention to provide a seismic sensor platform for retaining a plurality of unidirectional seismic sensors in positions that result in multidimensional sampling of reflected seismic energy.

It is another object of the present invention to provide a seismic sensor platform for retaining a plurality of seismic sensors in positions such that they may be easily replaced for repair or other purposes.

It is another object of the present invention to provide an elongated seismic platform for retaining at least three groups of rotatable seismic motion sensors.

It is another object of the present invention to provide a seismic sensing method in which seismic sensors of different natural frequency are employed to optimize multifrequency output.

DESCRIPTION OF THE PREFERRED EMBODIMENT

Figure 1:
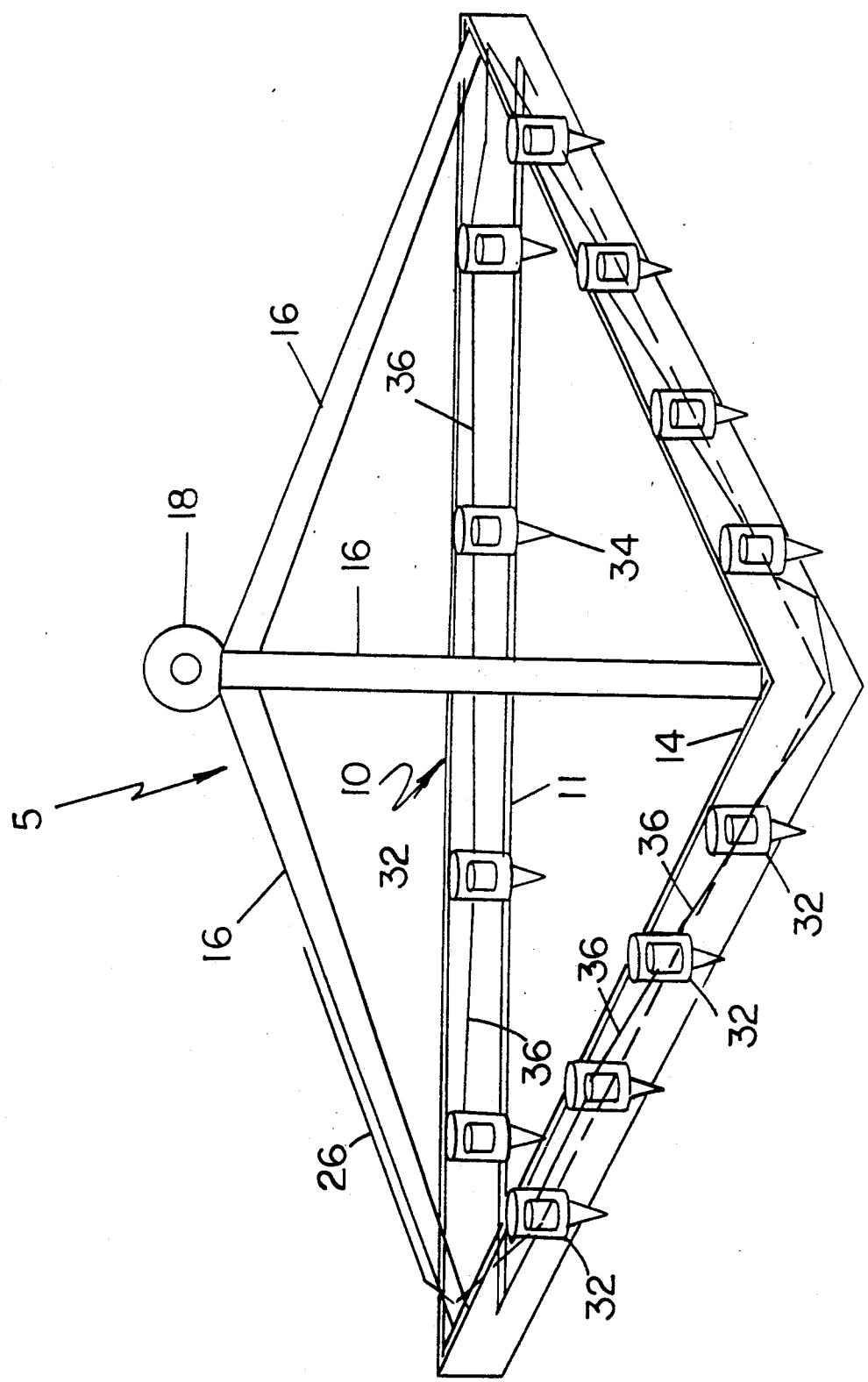
FIG. 1 is an illustration of a seismic sensor platform constructed in accordance with the present invention for use in tidal marine areas and fast moving rivers.
Figure 2:
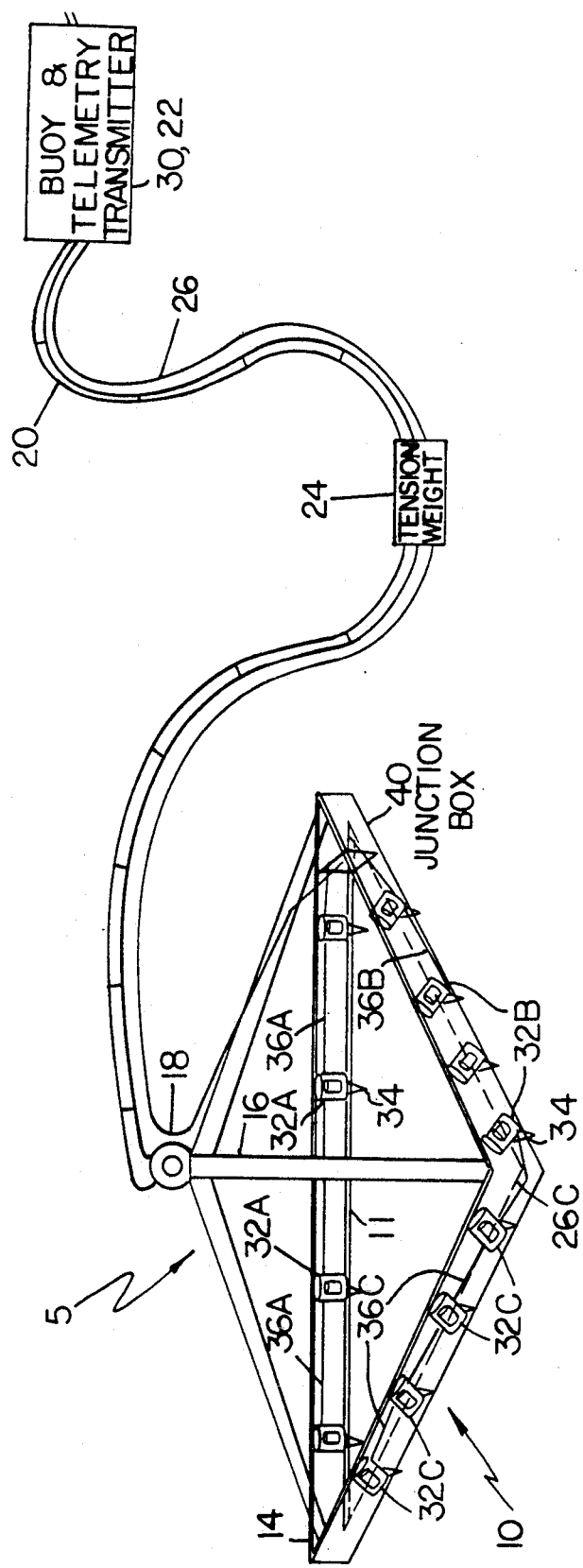
FIG. 2 is an illustration of the seismic sensor platform of FIG. 1 showing how a plurality of unidirectional seismic sensors are oriented to provide multidirectional seismic sensing.

Referring now to FIGS. 1 and 2, there is shown a seismic sensor platform 5 having an open triangular base 10. Triangular base 10 is L-shaped in cross section to include a vertical deflector member 14 and an inwardly directed horizontal shelf member 11. The horizontal shelf member 11 of triangular base 10 includes a plurality of holes for receiving a number of seismic sensors 32, which may comprise commercially available geophones, for example. Depending on the method of attachment of the particular type of seismic sensors 32 being employed, the holes in horizontal shelf member 11 of triangular base 10 may be threaded. Alternatively, seismic sensors 32 may simply be welded to the triangular base 10. Vertical deflector member 14 of triangular base 10 is of sufficient height to protect the seismic sensors 32, an electrical cable 36 connecting them, and an electrical junction box 40. Triangular base 10 is preferably constructed of a heavy, durable material such as steel. Three stabilizer support elements 16 are attached to triangular base 10 to form a tripod arrangement rising above triangular base 10 and employed for raising and lowering seismic sensor platform 5. An attachment ring 18 is provided at the top of the tripod arrangement formed by stabilizer support elements 16. Stabilizer support members 16 are preferably fabricated of steel. Alternatively, they may be fabricated of other materials such as rope or plastic. As illustrated in FIG. 2, a cord 20 is coupled to attachment ring 18 to facilitate raising and lowering of seismic sensor platform 5. In shallow water, an operator may position seismic sensor platform 5. In deeper water, it may be lowered from a boat. A buoy 22 is attached to a distal end of cord 20. Cord 20, which may comprise a nylon rope, includes incremental distance markings so that the user can readily determine the depth at which the seismic sensor platform 5 is anchored in a body of water. A tension weight 24 is positioned along cord 20 a short distance from sensor platform 5 to prevent the transmission of noise caused by the motion of cord 20 in the water above sensor platform 5. A conventional seismic telmetry transmitter 30 is positioned along cord 20 adjacent bouy 22 to transmit electrical signals received from seismic sensors 32 via a takeout wire 26 that is routed along cord 20. These signals are typically transmitted to a remotely located recording vehicle.

In accordance with the embodiment of seismic sensor platform 5 illustrated in FIG. 1, a plurality of individual seismic sensors 32 that may comprise conventional geophones, are attached along the horizontal shelf member 11 of triangular base 10. A sensor spike 34 that screws onto a protruding threaded stud on each of the seismic sensors 32 is employed to attach each of the seismic sensors 32 to triangular base 10 and also serves to individually anchor them in the earth at the bottom of the body of water into which seismic sensor platform 5 is submerged. Alternatively, sensor spikes 34 may be connected to the underside of triangular base 10 in close proximity to corresponding ones of the seismic sensors 32. A group wire 36 electrically connects the individual seismic sensors 32 as a series or parallel group and is itself connected to a takeout wire 26.

In accordance with the embodiment of sensor platform 5 illustrated in FIG. 2, groups of individual seismic sensors 32A, 32B, 32C are attached to triangular base 10 in a manner similar to that described in the preceding paragraph. The group of seismic sensors 32A are oriented vertically to sense a vertical component of seismic reflections. The groups of seismic sensors 32B and 32C are oriented horizontally such that the axes of seismic sensors 32B are perpendicular to the axes of seismic sensors 32C. The group of sensors 32B thereby senses a horizontal X-component of seismic reflections, while the group of seismic sensors 32C senses a horizontal Y-component of seismic reflections. The individual seismic sensors of each of the groups 32A, 32B, 32C are electrically connected in series or parallel, as desired by the user, through the use of group wires 36A, 36B, 36C which are routed to an electrical junction box 40 mounted at any convenient location on sensor platform 5. Junction box 40 typically contains a conventional power source, as required, along with conventional electrical circuitry for data signal enhancement and subsequent transmission via takeout wire 26. Junction box 40 may also be used to house a transponder for providing a signal that will permit accurate location of seismic sensor platform 5 when it is anchored at the bottom of a deep body of water.

Figure 3:
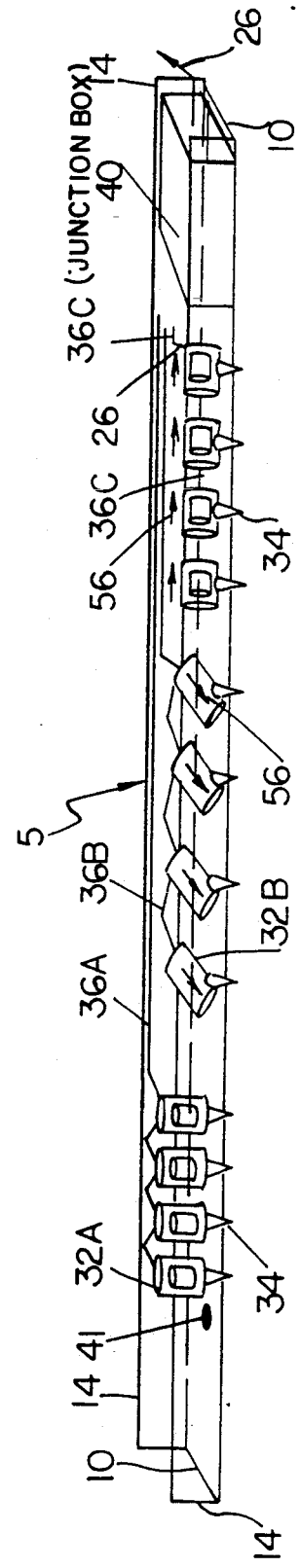
FIG. 3 is an illustration of a seismic sensor platform for use on land in which groups of unidirectional seismic sensors are positioned with different orientations to provide multidirectional seismic sensing.

Referring now to FIG. 3, there is is shown an alternative embodiment of a seismic sensor platform 5 for use on land rather than under water, as in the case of the embodiment illustrated in FIGS. 1 and 2. In the embodiment of FIG. 3, seismic sensor platform 5 is configured as a U-shaped channel having a flat base member 10 and a pair of vertical side members 14. As described in the preceding paragraph, the seismic sensor platform 5 of FIG. 3 includes groups of unidirectional seismic sensors 32A, 32B, 32C mounted on the base member and oriented as illustrated to sense the vertical component, horizontal X-component, and horizontal Y-component of seismic reflections. When used on flat terrain, each one of the group of seismic sensors 32B is aligned so its axis is parallel to the longitudinal axis of seismic sensor platform 5, and each one of the group of seismic sensors 32C is aligned so its axis is perpendicular to the longitudingal axis of seismic sensor platform 5. When used on a hillside, for example, the seismic sensor platform 5 is oriented, using a leveling bubble 41 to insure that it is level along its longitudinal axis, and each one of the group of seismic sensors 32B is rotated so as to be aligned with a seismic line on the hillside, and each one of the group of seismic sensors 32C is rotated 90 degrees with respect to the orientation of the group of seismic sensors 32B. Vertical side members 14 of seismic sensor platform 5 are of sufficient height to protect the seismic sensors 32A, 32B, 32C from physical damage as well as from wind noise. Leveling bubbling 41 may be mounted on the base member as an aid in leveling seismic sensor platform on uneven terrain. An electrical junction box 40 that is employed for the same purposes described in the preceding paragraph is mounted at one end of seismic sensor platform 5. Positioning arrows 56 are marked on each one of the groups of seismic sensors 32B and 32C for use as an aid to correctly orient those groups of seismic sensors.

Figure 4:
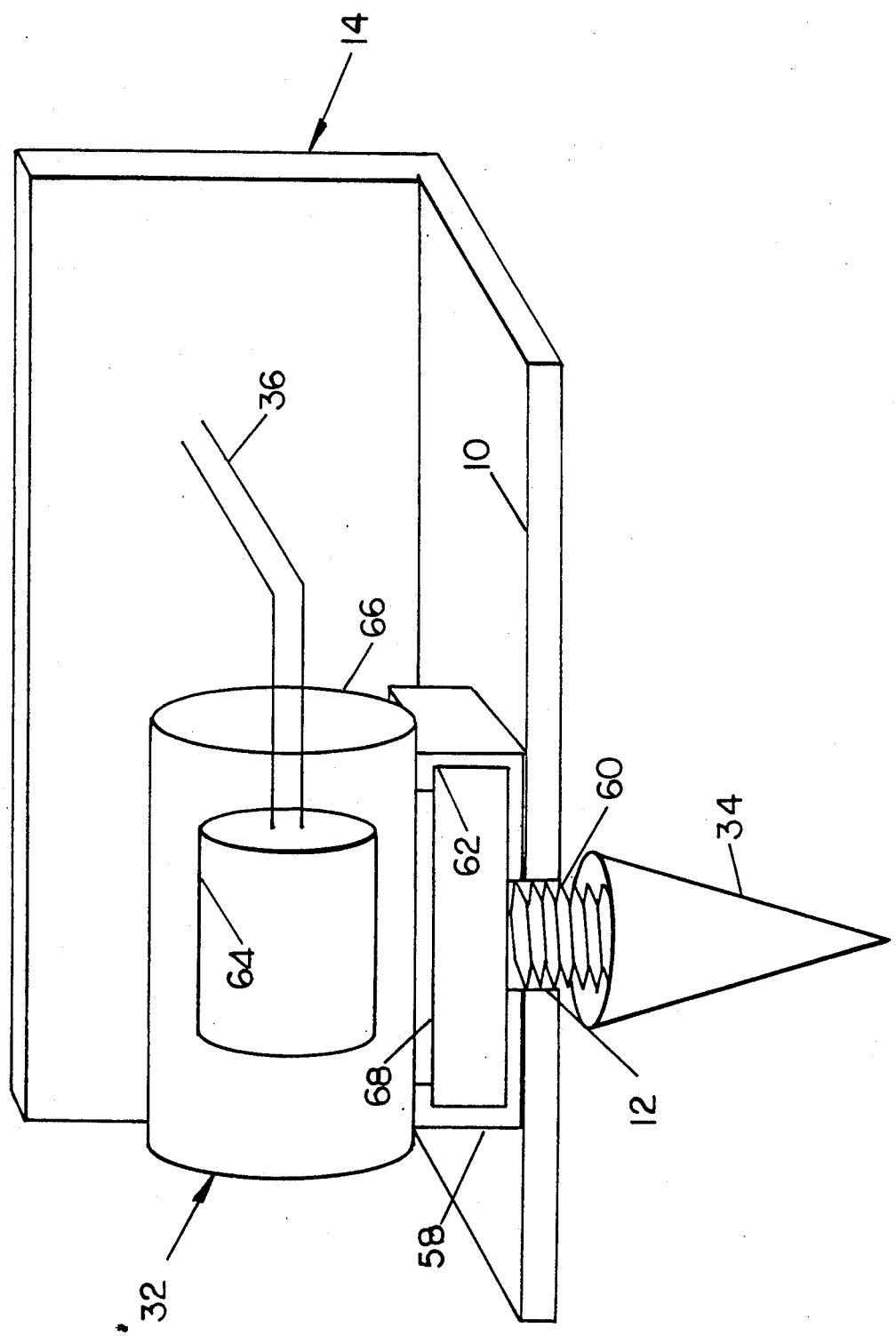
FIG. 4 is an illustration of a rotatable housing for mounting a horizontal seismic sensor in the seismic sensor platforms of FIGS. 1-3.

Referring now to FIG. 4, there is shown a rotatable housing for use in mounting the seismic sensors 32A, 32B, 32C illustrated in FIGS. 2 and 3. Each individual seismic sensor 32 snaps into a base casing 58 having a downwardly projecting threaded stud 60 that is placed in a hole in the horizontal shelf member 11 of FIG. 2 or base member 10 of FIG. 3. The conically-shaped sensor spike 34, having a threaded cavity therein, is screwed onto threaded stud 60 to secure the base casing 58. A snap-on rib protrusion 62 in base casing 58 is provided for receiving a transducer 64 that is encased within cylindrical casing 66. Casing 66 snaps into base casing 58. A circular notch 68 fits over snap-on rib protrusion 62 that permits 90 degrees of rotation of the cylindrical casing 66 with respect to base casing 58 to thereby facilitate proper orientation of the seismic transducer 64.

Alternatively, the groups of seismic sensors 32A, 32B, 32C of FIGS. 2 and 3 may comprise groups of seismic sensors in which each seismic sensor within a particular group has a selected natural frequency to thereby optimize the multifrequency output of the groups of seismic sensors 32A, 32B, 32C.

I claim:

1. A seismic sensor platform comprising:
    a rigid horizontal frame having a plurality of peripheral edges that define a selected geometric shape; and
    a plurality of seismic motion sensors vertically rigidly mounted in a common horizontal plane in spaced relationship along said plurality of peripheral edges of said frame, each of said plurality of seismic motion sensors including a housing having a downwardly projecting coupling device extending beneath said frame for anchoring each of said seismic motion sensors to said frame and to the earth;
    said frame including shield means, separate from the housing of each of said plurality of seismic motion sensors, for shielding said plurality of seismic motion sensors from physical damage and from environmental seismic noise.

2. A seismic sensor platform as in claim 1 wherein said frame comprises a triangular frame.

3. A seismic sensor platform as in claim 2 further comprising tripod means connected to said triangular frame and extending above said triangular frame for facilitating raising and lowering of said seismic sensor platform.

4. A seismic sensor platform comprising:
    a rigid horizontal frame having a plurality of peripheral edges that define a selected geometric shape; and
    a first plurality of seismic motion sensors vertically rigidly mounted in spaced relationship on said frame, a second plurality of seismic motion sensors horizontally mounted in spaced relationship on said frame, and a third plurality of seismic motion sensors horizontally mounted in spaced relationship on said frame, all of the seismic motion sensors comprising said first, second, and third pluralities of seismic motion sensors being mounted in a common horizontal plane, each of the seismic motion sensors comprising said second and third pluralities of seismic motion sensors being rotatable in said common horizontal plane, and each of said seismic motion sensors comprising said first, second, and third pluralities of seismic motion sensors including a housing having a downwardly projecting coupling device extending beneath said frame for anchoring each of said seismic motion sensors to said frame and to the earth.
    said frame including shield means, separated from the housing of each of said plurality of seismic motion sensors, for shielding each of said seismic motion sensors comprising said first, second, and third pluralities of seismic motion sensors from physical damage and from environmental seismic noise.

5. A seismic sensor platform as in claim 4 wherein said frame comprises a triangular frame.

6. A seismic sensor platform as in claim 5 further comprising tripod means connected to said triangular frame and extending above said triangular frame for facilitating raising and lowering of said seismic sensor platform.

7. A seismic sensor platform comprising:
    an elongated linear rigid frame having a flat bottom panel and vertical side panels; and
    a first plurality of seismic motion sensors vertically rigidly mounted in spaced relationship along said bottom panel, a second plurality of seismic motion sensors horizontally mounted in spaced relationship along said bottom panel, and a third plurality of seismic motion sensors horizontally mounted in spaced relationship along said bottom panel, all of the seismic motion sensors comprising said first, second, and third pluralities of seismic motion sensors being positioned in a common horizontal plane, each of the seismic motion sensors comprising said second and third pluralities of seismic motion sensors being rotatable in said common horizontal plane, each of said seismic motion sensors comprising said first, second, and third pluralities of seismic motion sensors including a housing having a downwardly projecting coupling device extending beneath said bottom panel of said elongated linear frame for anchoring each of said seismic motion sensors to the frame and to the earth, said vertical side panels of said elongated frame being of sufficient height to extend above said seismic motion sensors comprising said first, second, and third pluralities of seismic motion sensors to protect them from physical damage and to shield them from environmental seismic noise.

8. A seismic sensor platform as in claim 7 further comprising bubble level means mounted on said frame.

9. A seismic sensor platform as in claim 1 wherein each of said seismic motion sensors is detachably mounted to said frame.

10. A seismic sensor platform as in claim 4 wherein each of said seismic motion sensors is detachably mounted to said frame.

11. A seismic sensor platform as in claim 7 wherein each of said seismic motion sensors is detachably mounted to said frame 12. A seismic sensor platform as in claim 1 wherein said plurality of seismic motion sensors are mounted in a plurality of groups, the individual seismic motion sensors comprising a particular group and the plurality of groups being electrically interconnected in a selected configuration.

13. A method for conducting a seismic survey in a body of water, the method comprising the steps of:
    lowering into the body of water a rigid horizontal frame having a plurality of peripheral edges that define a selected geometric shape, the frame including a plurality of seismic motion sensors vertically rigidly mounted in a common horizontal plane in spaced relationship along said plurality of peripheral edges of said frame, each of said plurality of seismic motion sensors including a housing having a downwardly projecting coupling device extending beneath said frame for anchoring each of said seismic motion sensors to said frame and to the earth at the bottom of said body of water, the frame including shield means, separate from the housing of each of said plurality of seismic motion sensors, for shielding said plurality of seismic motion sensors from physical damage and rom environmental seismic noise;
    actuating a source of seismic energy; and
    recording indications of reflected seismic waves senses by said plurality of seismic motion sensors in response to actuation of said source of seismic energy.

14. A method for conducting a seismic survey in a body of water as in claim 13 further comprising the steps of:
    providing a tether line connected between the frame and a buoy on the surface of the body of water, the tether line being incrementally marked according to its length; and
    providing a tension weight at a point along the tether line a short distance from the frame to prevent the tranmission of noise along the full length of the tether line.

15. A method for conducting a seismic survey in a body of water as in claim 13 wherein each seismic motion sensor of said plurality of seismic motion sensors is of a different natural frequency.

16. A method for conducting a three-component seismic survey, the method comprising the steps of:
    coupling to the earth a rigid horizontal frame having a plurality of peripheral edges that define a selected geometric shape and that includes a first plurality of seismic motion sensors vertically rigidly mounted thereon, a second plurality of seismic motion sensors horizontally mounted thereon, and a third plurality of seismic motion sensors horizontally mounted thereon, all of the seismic motion sensors comprising said first, second, and third pluralities of seismic motion sensors being mounted on said horizontal frame in a common horizontal plane, each of the seismic motion sensors comprising said second and third pluralities of seismic motion sensors being rotatable in said common horizontal plane, each of the seismic motion sensors comprising said second plurality of seismic motion sensors being mounted in said common horizontal plane so as to be orthogonal to each of the seismic motion sensors comprising said third plurality of seismic motion sensors, and each of said seismic motion sensors comprising said first, second, and third pluralities of seismic motion sensors including a housing having a downwardly projecting coupling device extending beneath said frame for anchoring each of said seismic motion sensors in the earth, the frame including shield means, separate from the housing of each of said first, second, and third pluralities of seismic motion sensors, for shielding each of said seismic motion sensors comprising said first, second, and third pluralities of seismic motion sensors from physical damage and from environmental seismic noise;
    actuating a source of seismic energy; and
    recording indication of reflected seismic waves sensed by said first, second, and third pluralities of seismic motion sensors in response to actuation of said source of seismic energy.

17. A seismic sensor platform as in claim 12 further comprising junction box means mounted on said frame for housing electronic circuitry operative for transmitting electrical signals from said plurality of groups of seismic motion sensors to an external recording unit.

18. A seismic sensor platform as in claim 4 further comprising junction box means mounted on said frame for housing electronic circuitry operative for transmitting electrical signals from each of said first, second, and third pluralities of seismic motion sensors to an external recording unit.

19. A seismic sensor platform as in claim 7 further comprising junction box means mounted on said frame for housing electronic circuitry operative for transmitting electrical signals from each of said first, second, and third pluralities of seismic motion sensors to an external recording unit.

20. A seismic sensor platform as in claim 12 wherein each of said plurality of groups of seismic motion sensors comprises seismic motion sensors having a different natural frequency than any of the seismic motion sensors comprising any of the other groups.

21. A seismic sensor platform as in claim 4 wherein said first plurality of seismic motion sensors are of a first natural frequency, said second plurality of seismic motion sensors are of a second natural frequency, and said third plurality of seismic motion sensors are of a third natural frequency.

22. A seismic sensor platform comprising:
    a rigid horizontal frame having a plurality o peripheral edges that define a selected geometric shape; and
    a plurality of seismic motion sensors vertically rigidly mounted in a common horizontal plane in spaced relationship along said plurality of peripheral edges of said frame, each of said plurality of seismic motion sensors including a housing for anchoring each of said seismic motion sensors to said frame;
    said frame including shield means, separate from the housing of each of said plurality of seismic motion sensors, for shielding said plurality of seismic motion sensors from physical damage and from environmental seismic noise.

* * * * *